May 2, 1944. O. H. BANKER 2,347,654
TRANSMISSION
Filed April 8, 1941 3 Sheets-Sheet 3

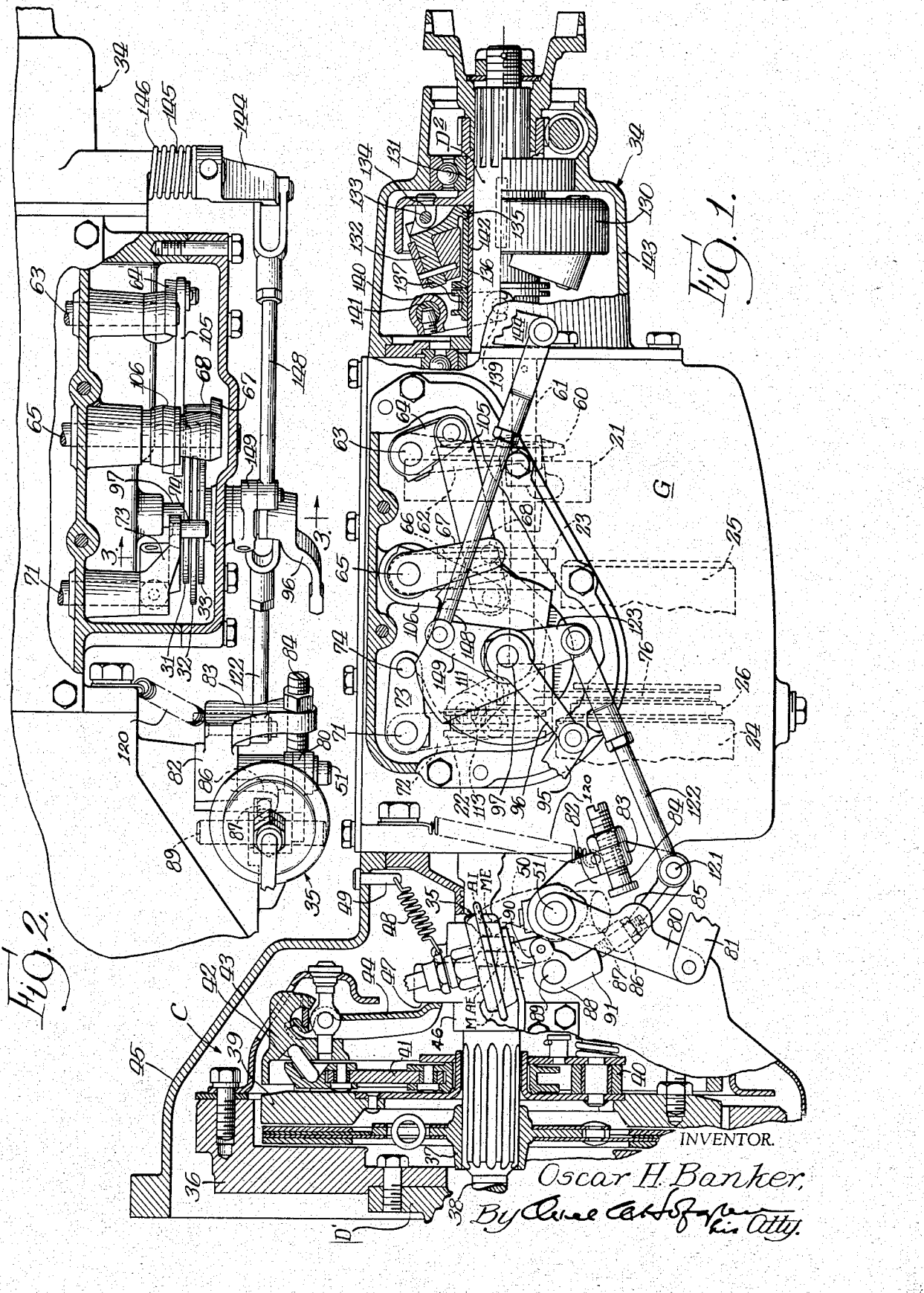

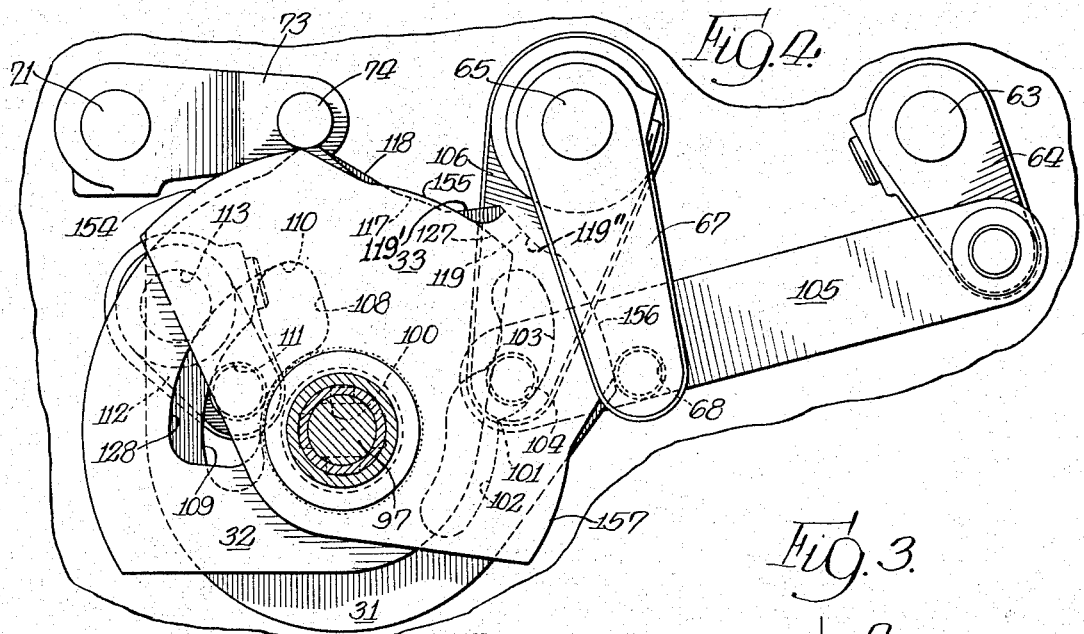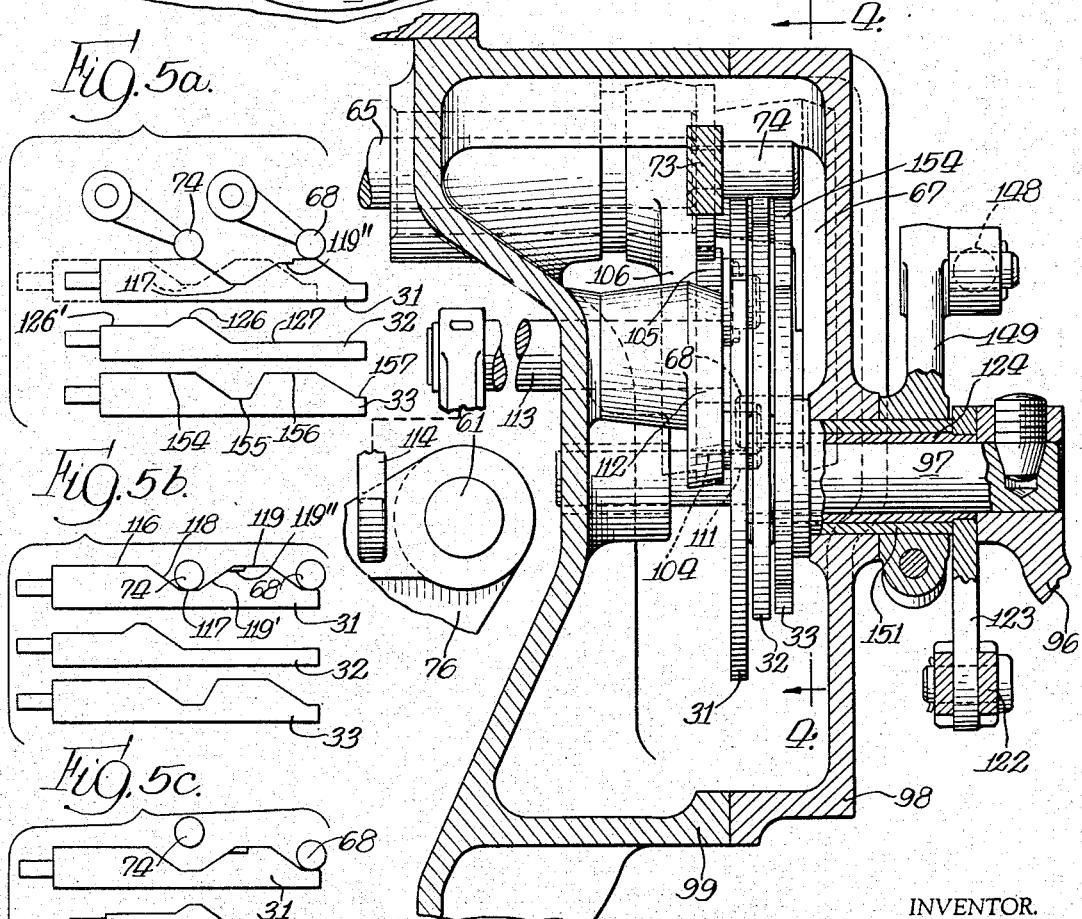

INVENTOR.
Oscar H. Banker,
BY
his Atty.

Patented May 2, 1944

2,347,654

UNITED STATES PATENT OFFICE 2,347,654

TRANSMISSION

Oscar H. Banker, Chicago, Ill., assignor to New Products Corporation, Chicago, Ill., a corporation of Delaware Application April 8, 1941, Serial No. 387,510

35 Claims. (Cl. 192—3.5)

The invention relates generally to a transmission and more particularly to control means for an automatic transmission of a type particularly adapted for use in automotive vehicles. One object of the invention is to provide a new and improved automatic transmission.

Another object is to provide in an automatic transmission having a driving element, a driven element, and means for varying the speed ratio of the elements, new and improved means for returning the transmission to a more effective power transmitting speed ratio as the vehicle embodying the transmission slows down.

Another object is to provide, in a transmission of the character described, new and improved means operating when a vehicle embodying the transmission is coasting automatically to keep the transmission in a speed ratio appropriate to the vehicle speed when drive by the engine is resumed.

Still another object is to provide an automatic transmission having coupling means automatically operating as the speed of the vehicle with which the transmission is associated increases, to vary the speed ratio, and speed responsive devices operating on the coupling means to vary the speed ratio in the opposite direction as the vehicle embodying the transmission coasts to lower rates of movement.

A further object is to provide an automatic transmission having a neutral and forward selector element, manual means for shifting the selector element, a first and a second coupling engageable and disengageable to change the speed ratios of the transmission, a first device responsive to the speed of the drive shaft, a second device responsive to the speed of the vehicle embodying the transmission, the first and second couplings being governed by each said manual means and said speed responsive devices, said manual means when in neutral position assuming control of both said first and second couplings, and when in forward position releasing control over one of said couplings to said second speed responsive device alone, and control over the other coupling to said speed responsive devices jointly.

Other objects and advantages will become apparent from the following detailed description taken in connection with the accompanying drawings, in which:

Fig. 1 is a side view of a transmission embodying the features of the invention, the view being partially in section and partially in elevation, with a casing element partially broken away to show a portion of the control means in elevation.

Fig. 2 is a top plan view of the control means only shown in Fig. 1 with a portion of the enclosing casing again broken away to reveal the control means in elevation.

Fig. 3 is a fragmentary and enlarged view of the control means, the view being taken approximately along the broken line 3—3 of Fig. 2.

Fig. 4 is a view of a portion of the control means taken approximately along the line 4—4 of Fig. 3.

Figs. 5a, 5b and 5c are diagrammatic illustrations of the control cams shown in the various positions assumed at different times in the operation of the control means.

Figure 6:
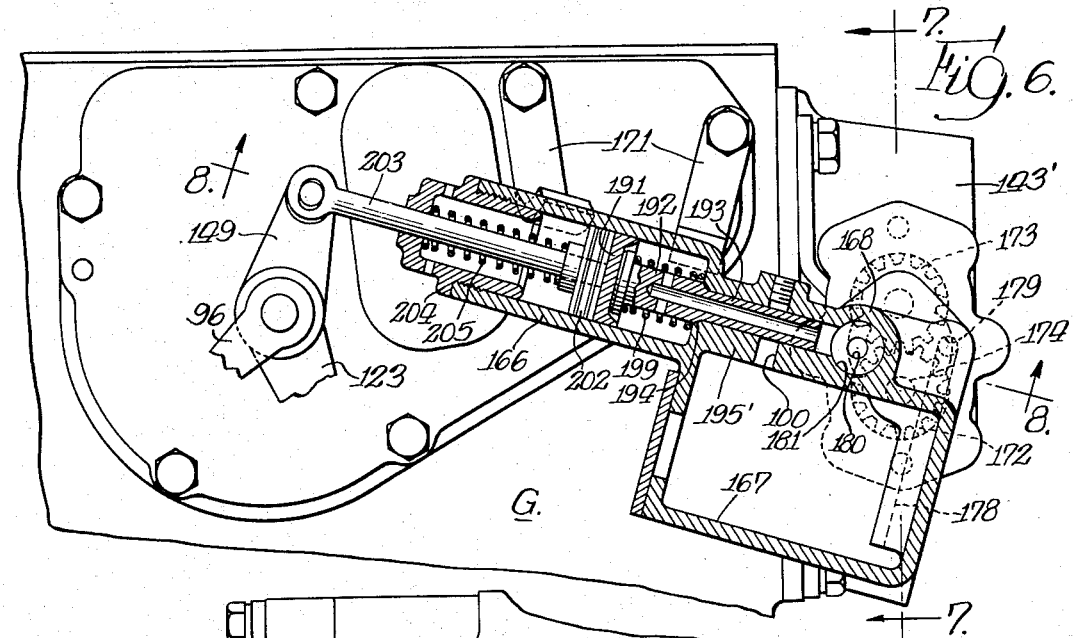
Fig. 6 is a sectional view illustrating a modified form of governor means responsive to the speed of movement of the vehicle with which the transmission is associated.

Though the control means herein disclosed is adaptable for use with a variety of transmissions, it is designed and particularly adapted for use in a transmission such as disclosed and claimed in my copending application Serial No. 164,025, filed September 15, 1937, now Patent No. 2,237,297, dated April 8, 1941. The control means will, therefore, for exemplary purposes only, be disclosed in association with such a transmission. However, it is not intended that such disclosure is to be taken as a limitation of the application of the control means, but it is intended that the control means be given the scope of application commensurate with the invention as defined in the appended claims.

Generally, the transmission disclosed in my above mentioned copending application comprises a driving element or shaft, a driven element or shaft, means operatively interposed between said elements to vary the relative speeds thereof, that is, their speed ratios, and a coupling or clutch for connecting the transmission to the engine of the vehicle in which the transmission is incorporated. As disclosed in my said copending application, the means interposed between the driving and driven elements for varying the speed ratio thereof is mechanical, taking the form of gearing, and thus provides definite speed or, more particularly, gear ratios, three such speed or gear ratios being provided in a forward direction, and a single speed ratio in reverse. As herein employed, speed ratio is synonymous with but broader than gear ratio, in that it is not limited to having the ratios obtained through gearing. It should also be borne in mind that ratios between the driving and driven elements of the transmission are here mentioned and not merely the terms high or low gear. A high speed or gear ratio will thus correspond to the conventionally called low gear, and low speed or gear ratio will thus correspond to the conventionally called high gear. The transmission is completed by control means for determining the direction and speed of movement of the vehicle for a given engine operation.

The transmission and the control means thereof are so designed that the selection of the direction of movement is made manually, while the selection of the speed ratio at which the transmission operates is made automatically but with the time of change, especially to a lower speed ratio, and to a degree to a higher speed ratio, under the control of the operator of the vehicle. This final control by the operator, moreover, is effected through the accelerator pedal, so as to be of maximum convenience to the operator. Superimposed upon the automatic speed ratio control is a further manual control associated with the selection of the direction of movement, and a manual control for effecting a shift of the transmission back to a higher speed ratio, normally utilized for rapid acceleration or deceleration purposes.

For a detailed disclosure, particularly of the gearing employed in the transmission, reference is made to my above mentioned copending application. Suffice it to say, therefore, that the transmission comprises generally a drive shaft $D^1$, a driven shaft $D^2$, a clutch or coupling C, and gearing housed in the casing G. The clutch C is an automatic clutch having driving and driven parts and means including centrifugal weights for effecting engagement of the parts in accordance with the speed of rotation of the drive shaft $D^1$, that is, in accordance with engine speed. There is thus embodied in the clutch C a speed responsive device which herein forms a part of the control means. The gearing comprises a direction selector element or gear 21 shiftable to forward, neutral, or reverse position; a coupling means or clutch 22 for directly coupling the driven part of the clutch C to the driven shaft $D^2$ to give a low speed ratio between the parts; a higher or intermediate speed ratio drive which includes an intermediate speed coupling or clutch 23 and an overrunning clutch 24; a still higher speed ratio drive which includes an overruning clutch 25 and the direction selector gear 21; and an intermediate speed ratio lockup clutch 26 for locking out the overrunning clutch 24. It is believed readily understood and is intended to be so understood that "speed ratio" refers to the relative rotative speeds of the driving to the ultimately driven parts of the transmission. Accordingly, when the parts have a low speed ratio, the driven part is actually rotating faster for a given engine speed than when the parts have a higher speed ratio.

The control means of the transmission includes speed ratio selector means exercising direct control over the condition of the clutches 22 and 23, which selector means, however, or final engagement of the clutches is under the further control of manually actuated means or automatic devices. The manual control comprises means for manually actuating the automatic clutch C, including a conventional clutch pedal and means for shifting the selector gear 21, such as a lever adapted to be grasped by the hand of the operator of the vehicle. Neither the clutch pedal nor the lever is herein shown, but both are disclosed in my above mentioned copending application. The manual means also includes a neutral or reverse lockout cam 31 associated with the direction selector means and acting directly on the speed ratio selector means, for preventing engagement of the clutches 22 and 23 when the selector gear 21 is in neutral or reverse position, and the before mentioned control through the accelerator pedal by which the operator of the vehicle determines the time of change to a different speed ratio. Automatic governing of the speed ratio selector means is effected by a cam 32 which is under the control of a first governor responsive to engine operation, herein the speed responsive portion of the automatic clutch C, and a cam 33 under the control of a second speed responsive device 34 responsive to the speed of rotation of the driven shaft $D^2$. A device 35, responsive to engine operation, which device also is partly under the control of the clutch pedal, is also provided for maintaining the clutch in its automatic position while the engine is running, and for locking the transmission in gear when the engine is dead for parking the vehicle on an incline, all as more particularly disclosed in my said copending application.

It is believed well to point out at this time that the clutches 22 and 23 are of the overrunning jaw type. In clutches of that character, as is well known, the elements thereof may be yieldably urged or cocked toward engaged position, but continue to overrun while certain relative speeds are maintained, but engage when the elements are synchronized or the relative rotation starts to reverse.

As previously stated, the automatic clutch C also functions as a speed responsive device. This clutch is fully and completely disclosed and described in my above mentioned copending application. Suffice it to say, therefore, that the clutch C has a driving part 36 and a driven part 37. The driving part 36 is secured to the flanged end of the driving shaft $D^1$, while the driven part 37 is secured to a shaft 38 which may be considered as an intermediate shaft of the transmission. Serving to cause engagement of the driving and driven parts at appropriate times is a pressure plate 39 and a plurality of centrifugal weights 40, only a portion of one of which is here shown, acting through suitable linkages 41 and struts 42 to cause the pressure plate to clamp the driven part to the driving part when the driving part exceeds a predetermined rotative speed. The struts 42 react against an annular member 43 rotatable with the driving part of the clutch and in turn governing pivotally mounted, radially inwardly extending fingers 44. It is through these fingers 44, the member 43, and the struts and linkages 42 and 41 that the centrifugal weights also serve as a speed responsive device exercising control over the elements of the gearing, as will hereinafter be described. For a more detailed description and disclosure of the construction and mode of operation of the clutch C, reference is made to my above mentioned copending application.

The clutch C is enclosed in a housing 45 having extending inwardly thereof a sleeve 46 encircling the shaft 38. Slidably mounted upon this sleeve 46 is a ball bearing collar 47, one face of which is adapted to engage the inner ends of the fingers 44. This collar is normally urged to a withdrawn position by means of a tension spring 48 anchored at one end to a pin 49 in the housing 45 and at the other end to the collar 47. Collar 47 may be urged forwardly, that is, to the left as viewed in Fig. 1, to engage and shift the fingers 44 by means of a yoke 50 fixed on a shaft 51 extending transversely of the housing 45. The manner of actuating the yoke 50 will be described hereinafter. As shown in Fig. 1, the clutch is in its automatic idle position, indicated as AI. When the shaft $D^1$ is caused to operate above a predetermined speed, usually the normal engine idling speed, the centrifugal weights 40 move outwardly in turn causing the linkage 41 to swing radially outwardly. As a result, the struts 42 are caused to assume a more nearly horizontal position causing engagement of the clutch and also causing a pivoting of the fingers 44 to assume what may be termed automatic engaged position of the clutch, which is represented by a dotted line position of the collar 47 referred to as AE. The clutch also has a position, indicated by the dotted line position of the collar referred to as M which represents a manually disengaged position, and a position, indicated by the dotted line position referred to as ME which is a manually engaged position of the clutch. These latter positions of the clutch are not particularly significant with respect to this invention, and are, therefore, not described in greater detail.

As previously generally stated, there is interposed between the driven part of the clutch C, herein the intermediate shaft 38, and the driven shaft $D^2$ means shiftable to determine the direction of rotation of the driven shaft $D^2$ and the speed ratio between the engine and the driven shaft, thus to select, for a given engine operation, the direction and speed of movement of the vehicle with which the transmission is associated. Also, as previously stated, this gearing includes the selector gear 21, clutches 22 and 23, and a lockup clutch 26. The transmission is designed to have one speed ratio in reverse and three speed ratios in a forward direction. For convenience, these speed ratios will be referred to as high, intermediate and low, though it is not intended that the terminology is to be interpreted as limiting the speed ratios to any particular ones, particularly not the specific speed ratios obtained by the transmission disclosed, but is intended to define three relative speeds. Accordingly, the selector gear 21 has a neutral, a forward, and a reverse position. In Fig. 1 the gear 21 is shown in its neutral position. Shift to the rear, that is, to the right as viewed in Fig. 1, places the transmission in reverse, and shift to the left as viewed in Fig. 1 places the transmission in a high speed ratio forward. The gear 21 is shifted through the medium of a yoke 60 slidable on a bar 61 and actuated by an arm 62 fixed on a control shaft 63 extending transversely of the gearing housing G. At one end this control shaft 63 projects outwardly through the side wall of the housing and at its projecting end carries fixedly mounted thereon a second arm 64.

The transmission is placed in a lower or intermediate speed ratio by engagement of the clutch 23 and is placed in a still lower speed ratio by engagement of the clutch 22. These clutches, as previously stated, are of the overrunning jaw type and are constantly urged in conventional manner by yieldable means toward engaged position. To disengage the clutches and to hold them in disengaged or, more particularly, in uncocked position, that is, restraining the yieldable means from urging them toward engaged position, there is provided for the clutch 23 a control shaft 65 extending transversely of the gearing housing G. Fixed to rock with the shaft 65 is a yoke 66 engaging the clutch 23 to shift the same axially when the shaft is rocked. One end of the shaft 65, like the shaft 63, projects through the side wall of the housing and at that end has fixedly mounted a control arm 67 terminating at its free end in a cam follower 68. Likewise, there is provided for the clutch 22 a control shaft 71 extending transversely of the housing G and projecting at one end through the side wall of the housing. Internally of the housing, the shaft 71 has fixed thereon a yoke 72 which engages the clutch 22 and operates to shift the clutch axially into engaged or disengaged position. At its projecting end, the shaft 71 has fixed thereon a control arm 73 which terminates in a cam follower 74.

The lockup clutch 26 is also of the overrunning jaw type. Like the clutches 22 and 23, it is urged toward engaged position by suitable yieldable means unless restrained. When engaged, it places the transmission in a positive intermediate speed ratio employed for rapid acceleration or for braking by the engine. The clutch 26 is shifted to disengaged position and is retained in uncocked position through the medium of a yoke 76 slidable on the bar 61.

Having described generally the drive or power transmitting portions of the transmission, the control means therefor will now be described. The normally operable control means of the transmission is automatic, and this means functions except in special instances where it is desirable for the operator to modify the normal operation by certain manual control means. Among the manual control means is that for the clutch C and includes the conventional clutch pedal. To permit of such manual control of the clutch, the shaft 51 projects outwardly of the housing 45 and at its projecting end has rotatable thereon a lever 80. At its free end the lever 80 has pivoted thereto a link 81 which, through suitable additional linkage (not shown), is connected to the clutch pedal in such manner that depression of the clutch pedal swings the lever 80 in a counterclockwise direction about the shaft 51. Rigid on the projecting end of the shaft 51 is a multi-armed member 82. The member has a first radially and then laterally projecting arm 83 carrying at its end an adjustable abutment 84. The arm 83 projects laterally in a direction to overlie the lever 80 and has its abutment 84 disposed in the plane of the lever 80, so that the abutment may be struck by the lever when swung in a counterclockwise direction. The lever 80 is formed intermediate its ends with a rounded nub 85 provided for that purpose, and it will be seen that as the lever 80 is swung in a counterclockwise direction the member 82 and hence the shaft 51 will also be rocked in a counterclockwise direction, with the result that through the yoke 50, collar 47 and fingers 44 the automatic clutch C will be shifted to the manually disengaged position M.

The member 82 has a second laterally projecting arm 86 carrying at its end an adjustable abutment 87. This latter abutment is disposed in the plane of rotation of a crank 88 pivotally mounted on the clutch housing 45 at 89, and having one arm 90 connected to be actuated by the vacuum device 35. The other arm 91 of the crank 88 is disposed to have its end engaged by the abutment 87 when the crank is in the position which it assumes during operation of the engine. The device 35 is, as more fully disclosed in my above mentioned copending application, operated by vacuum in the engine manifold and functions to rotate the crank 88 in a counterclockwise direction to the position shown in Fig. 1 when the engine is in operation, and tends to rotate the crank in a clockwise direction when the engine is not running. Through the crank 88, the vacuum device 35 thus serves normally to retain the clutch in its automatic idle position, even though the engine is not in operation, since the abutment 87 normally contacts the end of the crank arm 91 before the engine stops. With the crank 88 thus engaged by the abutment 87, the device 35 is unable to rotate the crank and the automatic clutch thus remains in automatic idle position. However, should it be desired to place the clutch C in its manually engaged position, this may be accomplished by momentarily depressing the clutch pedal to relieve the pressure of the abutment 87 on the crank 88. With such release of pressure, the device 35 rocks the crank in a clockwise direction a sufficient distance to bring the end of the arm 91 out of the path of the abutment 87, thus enabling the member 82 to swing farther in a clockwise direction, permitting the clutch to assume its manually engaged position. This position of the clutch is employed when it is desired to leave the vehicle in gear while parking, or to place the vehicle in gear when the engine is not running and it is desired to turn the engine by pushing the vehicle.

Also among the manual control means is the means for controlling the position of the direction selector gear 21. This means, as previously stated, includes a shiftable lever disposed in the driver's compartment. This lever is, by suitable means including a link 95, connected to an arm 96 fixed on the end of a stub shaft 97 (see Fig. 3) journaled at one end in the wall of the housing G and journaled intermediate its ends in a closure member 98 forming with means on the housing G an auxiliary casing 99 protectively enclosing much of the control means about to be described.

Non-rotatably mounted on the shaft 97, as by means of a flattened portion 100 of the shaft, within the casing 99 is the forward or reverse lockout disk cam 31. Formed in the cam (see Fig. 4) is a sinuous slot 101 having a portion 102 concentric with the shaft 97 and a portion 103 also arcuate in shape but extending obliquely outwardly from its point of merger with the portion 102. Operating in this slot is a cam follower 104 carried on one end of a link 105, the other end of which is pivotally connected to the free end of the arm 64 of the selector gear shifting means. The end of the link 105 carrying the cam follower is supported by a link 106 freely pivoted on the shaft 65.

In the positions shown in Fig. 1, the cam and the selector gear are in neutral position. Rotation of the cam 31 in a clockwise direction will force the follower 104 radially outwardly and thereby rock the shaft 63 in a counterclockwise direction, shifting the selector gear 21 to reverse position. Rocking the cam 31 in a counterclockwise direction from its neutral position will force the follower 104 radially inwardly, thereby rocking the shaft 63 in a clockwise direction and shifting the selector gear 21 to its forward position. Further rocking of the cam 31 in a counterclockwise direction causes the follower 104 to ride through the concentric portion 102 of the slot, thereby maintaining the selector gear in its forward position.

The cam 31 is formed with a second cam slot 108 having a portion 109 concentric with the axis of the cam and at one end a radially extending portion 110. Operating in the cam slot 108 is a cam follower 111 carried on the free end of an arm 112 fixed on the end of a shaft 113 projecting through the side wall of the gearing housing G. Fixed on the other end of the shaft 113 is a finger 114 which acts on the yoke 76 to control the lockup clutch 26. When the follower 111 is in the arcuate portion 109 of the slot the finger 114 shifts the yoke 76 to maintain the lockup clutch disengaged, but when the follower enters the radially extending portion 110, the finger 114 is withdrawn to permit the clutch to be urged toward engaged position by its yieldable means. The slot 108 is so positioned with respect to the slot 101 that the follower 111 remains in the arcuate portion 109 of the slot in all positions of the cam except when the same is rotated to the extreme of its limit in a counterclockwise direction.

In addition to controlling the selector gear 21 and the lockup clutch 26, the cam 31 also exercises control over the clutches 22 and 23. To that end it is formed with cam surfaces on its periphery. These peripheral cam surfaces may be divided into two groups, one for the control of the clutch 22 and the other for the control of the clutch 23. The first group includes three arcuate and concentric surfaces 116, 117 and 119″ (here shown diagrammatically in Figs. 5a, 5b and 5c), with the surface 117 shorter and spaced radially inwardly (Fig. 4) with respect to the surface 116. Surface 119″ is spaced just slightly radially inwardly with respect to surface 116. The surfaces 116 and 117 are connected by an inclined portion 118 and the surfaces 117 and 119″ are connected by an inclined portion 119′ to permit the cam follower 74 to travel from one surface to the other. When the cam follower 74 rides on the surface 116, which it does while the cam 31 is in its neutral or reverse positions, the clutch 22 is held disengaged, but when the follower rides on the surface 117, which it does when the cam is in its forward position, the clutch 22, in so far as this cam is concerned, is free to be shifted to engaged position by its yieldable means. When the cam follower 74 rides on the surface 119″, which it does while cam 31 is in its second speed lockup position, the clutch 22 is held partially disengaged. That is, the clutch is engaged to the extent that, because of the beveled faces of the jaws of the clutch, the vehicle is capable of driving the engine but the engine is not capable of driving the vehicle. The other group is composed of the concentric surface 119 upon which the cam follower 68 of the clutch 23 rides when the cam 31 is in its neutral or reverse positions. While so riding on the cam surface 119, the follower 68 through the arm 67 and yoke 66 positively holds the clutch 23 in disengaged position. When the cam is in its forward or intermediate speed lockup positions, the follower 68 is opposite an ineffective portion of the periphery of the cam 31 and thus, in so far as the cam is concerned, frees the clutch 23 for shift to engaged position by its yieldable means.

Automatic control, as previously stated, is effected by speed responsive devices. One of these is responsive to the speed of engine operation or, more particularly, to the speed of rotation of the drive shaft $D^1$. Herein advantage is taken of the speed responsive means forming a part of the automatic clutch C, since the weights 40 of the clutch are responsive to the speed of rotation of the drive shaft $D^1$. It is to be understood, of course, that the invention is not to be limited to the use of a speed responsive means such as here disclosed, or even one forming part of an automatic clutch, but that any one of a variety of speed responsive means would serve equally well. As previously described, as the speed of rotation of the drive shaft $D^1$ exceeds a predetermined value, that value conventionally being the normal idling speed of the engine, the centrifugal weights are actuated and, in turn, cause a pivoting of the fingers 44. With such pivoting of the fingers, the collar 47 moves to the left, as viewed in Fig. 1, and the yoke 50 follows such shift to rock the shaft 51 in a counterclockwise direction carrying with it the multi-armed member 82. A spring 120 stronger than the spring 48 constantly urges the shaft 51 in a counterclockwise direction. The member 82 has pivotally connected thereto at 121 one end of an adjustable rod 122 (see Fig. 1) the other end of which is pivotally connected to the free end of an arm 123. This arm is rigid with one end of a sleeve 124 (Figs. 3 and 4) loosely encircling the shaft 97. The other end of the sleeve has non-rotatably fixed thereon the second disk cam 32. This cam exercises control over the clutch 22 only and to that end is provided with suitable peripheral cam surfaces to be engaged by the follower 74. As best seen in Fig. 5a, the cam has a high surface 126 which is so disposed as to engage the follower 74 when the automatic clutch is in its automatic idle position. When the cam follower 74 rides on the surface 126, the clutch 22 is held positively disengaged. To one side of the surface 126 and connected therewith by a gradual sloping surface is a concentric surface 126', and to the other side is a surface 127. Both surfaces 126' and 127 are spaced inwardly with respect to the surface 126, but such inward spacing of the surface 126' being only slight, corresponding to that of the surface 119" of cam 31. The surface 127 is disposed opposite the cam follower 74 when the clutch C is in its automatic engaged position, and, in so far as this cam is concerned, thus would permit the clutch 22 to be shifted to engaged position. When the surface 126' is disposed opposite the cam follower 74, the clutch 22 is partially engaged as explained in connection with surface 119' of cam 31. Surface 126' comes into play when the transmission is conditioned for starting the engine by pushing the car. Formed in the cam 32 is an arcuate slot 128 to accommodate the end of the cam follower 111 which projects through the cam 31. The slot, however, exercises no control over the follower 111.

The other of the two speed responsive devices is the governor 34 which is responsive to the rate of movement of the vehicle with which the transmission is associated. In the present instance, the governor is made responsive to the speed of rotation of the driven shaft $D^2$ since the latter bears a definite relationship to the rate of movement of the vehicle, though, of course, the governor might be made responsive to the movement of some other part. The governor comprises a drum-like member 130 having a hub 131 keyed onto a portion of the shaft $D^2$ projecting outwardly beyond the end of the gearing housing G. Carried by the member 130 are a pair of semi-circular weights 132, each of which is pivotally secured for outward swinging movement under the influence of centrifugal force by a pin 133 to ears 134 secured on the member 130. Each weight has a heel 135 bearing against a sleeve 136 slidable longitudinally of the shaft $D^2$. Also slidable longitudinally of the shaft $D^2$ and in turn abutted by the sleeve 136 is a collar 137 having an annular groove for the reception of followers 139 carried by the ends of a yoke 140 rigid with a shaft 141 extending transversely of the shaft $D^2$. The sleeve 136 and the collar 137 preferably are slidable on an inner sleeve 142 directly encircling the shaft $D^2$.

The governor is enclosed in a casing 143 which provides bearings for the shaft 141 and through which one end of the shaft projects. Non-rotatably affixed to this projecting end of the shaft is an arm 144 having an elongated hub 145. Encircling the hub and secured at one end in the arm and at the other end in the casing 143 is a torsion spring 146 applied to urge the shaft 141 in a counterclockwise direction as viewed in Fig. 1, and thus to urge the collar 137 and the sleeve 136 to the right to draw the weights 132 inwardly to their inner position. The governor is so designed that the weights 132 are in their outer position whenever the rate of movement of the vehicle is in excess of approximately five M. P. H. and that they will be in their inner position when the rate of movement of the vehicle drops below approximately five M. P. H.

The governor 34 is provided for the purpose of returning the transmission to its high speed ratio when the rate of movement of the vehicle drops below approximately five M. P. H., and to that end provision is made to have the governor exercise control over both the clutch 22 and the clutch 23. To that end the arm 144 is by an adjustable rod 148 connected to an arm 149 of the third control cam 33. In order that the cam 33 may have the same axis as the cams 31 and 32, it is rigidly mounted on the inner end of a sleeve 151 rotatable on the sleeve 124. The outer end of the sleeve 151, of course, has rigidly mounted thereon the arm 149.

Inasmuch as the cam 33 exercises control over both the clutch 22 and the clutch 23, its periphery is, like the cam 31, divided into two groups of cam surfaces, one for the follower 74 and the other for the follower 68. In the first group is a high surface 154 and a low surface 155. Similarly, the other group is composed of a high surface 156 and a low surface 157, the cam having only two positions, the surfaces of each group being connected by an inclined surface. When the weights of the governor 34 are in their inner position, the cam 33 will be so positioned that the followers 74 and 68, which are common to all three cams, will ride on the high surfaces 154 and 156, respectively, and thus will be so positioned as to cause the clutches 22 and 23 to be disengaged. When, however, the rate of movement of the vehicle exceeds five M. P. H. the weights of the governor will be in their outer position, and hence will have swung the cam 33 in a counterclockwise direction bringing the low cam surfaces 155 and 157, respectively, opposite the followers 74 and 68. In that position of the cam, in so far as this particular cam is concerned, the clutches 22 and 23 would be free to be shifted toward engaged position by their yieldable means, though, of course, such shift might be prevented by one of the other cams.

Having described the control means, the operation thereof and of the transmission will now be reviewed. For that purpose, let it be assumed that the engine is dead, that the selector gear 21 is in its neutral position, and that the manual clutch pedal was not manipulated to place the automatic clutch in manually engaged position. Under those conditions, the automatic clutch will be in its automatic idle position. The governor 34 will also not be actuated and hence all of the control cams 31, 32 and 33 will be in the positions shown in Fig. 1 and in Fig. 5a. As a result both the clutches 22 and 23, as well as the lockup clutch 26, will be disengaged.

The operator of the vehicle may then start the engine in the normal manner and permit the same to run at idling speed. At this speed the automatic clutch C remains in its automatic idle position, that is, it remains disengaged, and there is thus no transmission of power from the engine to the gearing and the operator is free to shift the selector gear 21 to either reverse or forward position, depending upon the direction in which he wishes to move the vehicle. If he wishes to back the vehicle, he actuates the hand lever to rotate the cam 31 in a clockwise direction, as viewed in Figs. 1 and 4. This rotation of the cam 31 through the medium of the portion 103 of the cam slot 101 acting on the follower 104 shifts the selector gear rearwardly, that is, to the right as viewed in Fig. 1, and thus connects the transmission in reverse gear. Though the cam 31 has thus been shifted to its reverse position, the followers 68 and 74 continue to ride on the high surfaces 115 and 116, and thus the clutches 22 and 23 are held in disengaged position so long as the transmission remains in reverse. Likewise, the follower 111 remains in the concentric portion 109 of the slot 108 and thus the lockup clutch 26 also is held in disengaged position. The operator may now accelerate the engine and, with such acceleration above idling speed, the automatic clutch engages and the vehicle is driven rearwardly.

To place the transmission in condition for forward movement of the vehicle at the various forward speeds, the operator manipulates the cam 31 in a counterclockwise direction from its position shown in Fig. 1 to its forward position. This rotation of the cam in a counterclockwise direction through the cam slot 101, the follower 104, and associated mechanism shifts the selector gear 21 forwardly, that is, to the left in Fig. 1, to its forward position. This position of the cam and its effect upon the transmission is best seen in Fig. 5a wherein the forward position of the cam is indicated by the dotted outline of the cam. Though the low portions of cam 31 are now opposite followers 68 and 74, and would thus permit clutches 22 and 23 to be shifted toward engaged position, the clutches are nevertheless held disengaged by the cams 32 and 33, and the gearing is thus in its highest speed ratio. The operator now may accelerate the engine and with such acceleration the automatic clutch C engages to transmit power to the gearing and the vehicle moves forward in its high speed ratio. With the engagement of the automatic clutch, the cam 32 is rotated in a counterclockwise direction, but this also has no effect on the clutches 22 and 23 which are now controlled by the cam 33. As the vehicle accelerates and exceeds the arbitrary rate of five M. P. H. the governor 34 is actuated to cause the weights 132 to assume their outer position, thereby rotating the cam 33 in a counterclockwise direction, as viewed in Fig. 1, so that all of the cams now have the position shown in Fig. 5b. It will readily be apparent that all of the low surfaces of the cams are now in registry and opposite both the follower 68 and the follower 74, freeing the clutches 22 and 23 to be urged toward engaged position by their respective yieldable means. The operator may now cause final change in the gearing to take place at such time as he desires simply by a momentary deceleration of the engine. Upon such momentary deceleration, the parts of the clutch 23 first become synchronized and engage, thereby placing the gearing in an intermediate speed ratio. The operator upon acceleration of the engine may now run the car in such intermediate speed ratio until he desires to shift to a still lower speed ratio, at which time he again momentarily decelerates the engine, permitting the parts of clutch 22 to reach synchronization and thus become engaged. The transmission is now in its low speed ratio, herein in a 1:1 or direct drive.

It is a feature of the control means herein disclosed that, after a period of coasting of the vehicle, the transmission always assumes a speed ratio appropriate for the reapplication of power at the then rate of movement of the vehicle. More particularly, the control means is designed automatically to return the transmission to higher speed ratios as the vehicle coasts to lower rates of movement. This change is completely automatic and without attention on the part of the operator of the vehicle where the vehicle coasts to such lower rates of movement, and is automatic but under the control of the operator where such slowing down results from inability of the engine to drive the vehicle. Thus, if while the vehicle is coasting the rate of movement of the vehicle is reduced below some predetermined rate, such, for example, as ten M. P. H. the device responsive to the speed of rotation of the drive shaft $D^1$, herein the clutch C, will drop out and, as a result, shift the cam 32 in a clockwise direction to the position shown in Fig. 5c. It is mentioned at this point that where the speed responsive device forms a part of the automatic clutch, as in the present instance, the speed of the engine or of the drive shaft $D^1$ at which the automatic clutch disengages corresponds to this arbitrarily selected rate of ten M. P. H. of the vehicle when the transmission is in its low speed ratio. With the shift of the cam 32 to the position shown in Fig. 5c, the clutch 22 is positively disengaged, thereby returning the transmission to its intermediate speed ratio. In this speed ratio, the automatic clutch will again engage and drive the vehicle, even though it may continue to move at less than ten m. p. h.

Should the rate of movement of the car be still further reduced and drop below five m. p. h., the governor 34 would drop out and thereby shift the cam 33 in a clockwise direction to cause the cam to assume the position shown in Fig. 5a. In this position, as previously described, the cam would hold both the clutch 22 and the clutch 23 positively disengaged, thereby returning the transmission to its high speed ratio in which speed ratio it would remain until the vehicle had again been accelerated to normal driving speed, at which time the operator could cause the transmission to be shifted to lower speed ratios at the will of the operator.

The change of the transmission to higher speed ratios when the vehicle coasts to the lower rates of movement above mentioned is completely automatic and without attention on the part of the operator of the vehicle, because during such coasting the drive transmitted through the gearing, and particularly through the clutches 22 and 23 thereof, is not so great but what the speed responsive devices are capable of disengaging the clutches. When, however, the engine continues to drive the vehicle but, due to road conditions, the vehicle nevertheless slows down, change in the transmission to higher speed ratios is not accomplished without attention on the part of the operator, because with the gearing continuing to transmit power from the engine to the vehicle the speed responsive devices are incapable of disengaging the clutches. This is advantageous in that, while the engine is driving the vehicle, the transmission will not change to a different speed ratio against the will of the operator of the vehicle. It will be apparent, however, that the change is made completely automatically but with the time of change under the control of the operator through the accelerator pedal. A momentary release of the accelerator pedal when the rate of movement of the vehicle is below the predetermined rate will permit such change in the transmission, for such momentary release of the accelerator pedal will momentarily take the driving pressure off of the clutches and thus permit the speed responsive devices to disengage the clutches.

Should it be desirable with the transmission in its low speed ratio to place the transmission in its intermediate speed ratio for more rapid acceleration or deceleration of the vehicle, this may be accomplished without necessity of a drop in the speed of the vehicle by further rotation of the cam 31 in a counterclockwise direction to its second speed lockup position. In this position of the cam 31, the follower 111 is free to enter the radial portion 110 of the slot 108, thereby releasing the clutch 26 to its yieldable means, whereupon the same becomes engaged to lock out the overrunning clutch 24 normally forming a part of the intermediate speed ratio drive train. With such further rotation of cam 31 in a counterclockwise direction, and just prior to such entry of follower 111 into portion 110, surface 119'' acts on the follower 74 with the result that the clutch 22 is partially disengaged as previously described. Such partial engagement keeps the transmission in positive gear, while permitting the engine to speed up to the rate necessary before the lockup clutch can engage.

Figure 7:
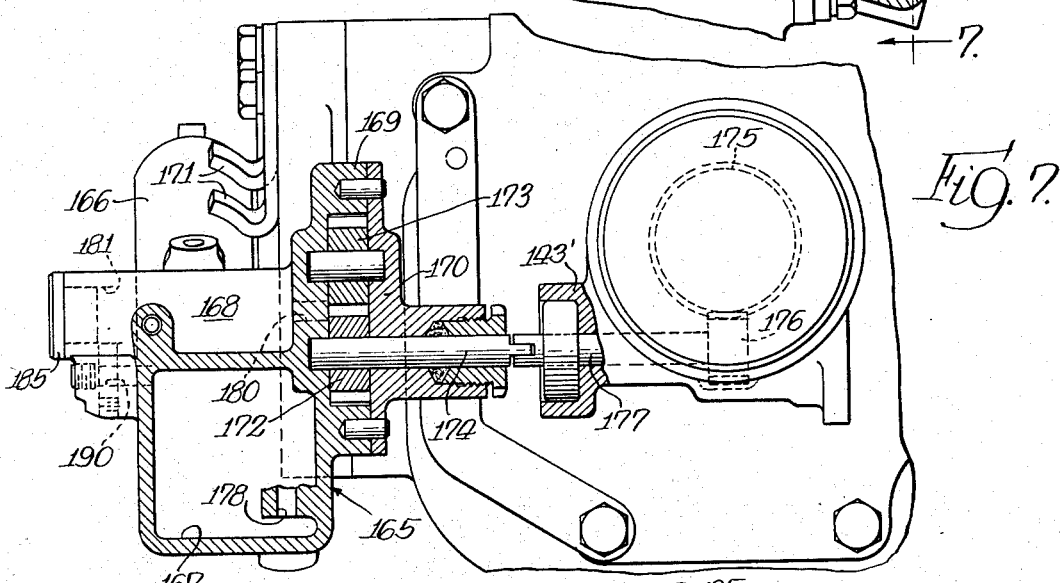
Fig. 7 is a view taken approximately along the line 7—7 of Fig. 6.
Figure 8:
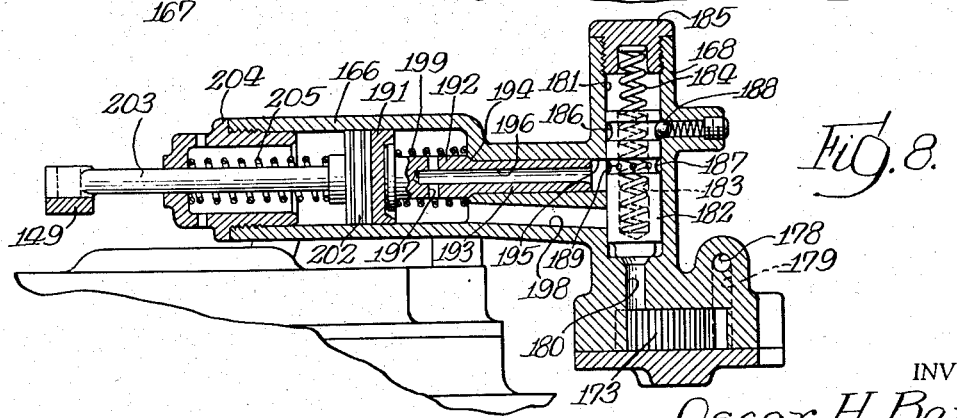
Fig. 8 is a sectional view taken approximately along the line 8—8 of Fig. 6.

In Figs. 6 to 8, there is disclosed a modified form of device responsive to the rate of movement of the vehicle for controlling the cam 33. This modified form of governor employs the principles of hydraulics rather than of centrifugal force, and is exemplary of a variety of hydraulic devices that might be employed. It comprises a casing 165 providing a cylinder 166, a fluid reservoir 167, a valve housing 168, and the major part of a pump casing 169. The pump casing is completed by a cap member 170 bolted to the portion 169. This casing 165 is supported at one side of the gearing housing G by brackets 171 bolted to the casing G and welded to the cylinder 166. Housed within the pump casing formed by the cap member 170 and the portion 169 is a fluid pressure generating device, herein taking the form of a gear pump having a driving element 172 and a driven element 173. The driving element 172 is non-rotatably mounted on a shaft 174 which projects outwardly through a bearing in the cap member for driving connection with the driven shaft $D^2$ of the transmission. In order that the fluid pressure generating means may be driven from the shaft $D^2$, there is fixed on the projecting end of the shaft a gear 175 which meshes with a gear 176 rigid with a shaft 177 projecting outwardly of a housing 143' which encloses the gears 175 and 176 and replaces the housing 143 of the preferred form.

The fluid pressure generating device receives fluid from the reservoir 167 through an intake passage 178 and an intake port 179, and discharges through a discharge port 180 to one end of a cylindrical bore 181 in the valve casing 168. Reciprocable in the bore 181 is a piston valve 182, one end of which seats over the discharge port 180 so as to control the flow of fluid therethrough. Opening through the opposite end of the valve is an axial passage 183 which also serves to receive one end of a compression spring 184, the other end of which is received in a pocket formed in an end closure 185 for the valve housing 168. Formed in the valve is an annular groove 186 and an annular groove 187 spaced axially from the groove 186 in the direction of the closed end of the valve. The first groove 186 has no connection with the passage 183 and serves merely to cooperate with a spring pressed detent 188 to hold the valve yieldably in one of its two positions, in this case its closed position. The other groove 187, in addition to serving as a cooperating means for the detent 188 to hold the valve in its open position, is formed with a plurality of radial ports 189 which communicate with the passage 183 and thus with the end of the bore 181 adjacent the closure 185. At that end, there communicates with the bore 181 (see Fig. 7) a passage 190 by which fluid is returned to the reservoir 167.

Reciprocable in the cylinder 166 is a first piston 191 having a piston rod 192 with a reduced portion 193 forming an abutting shoulder 194 limiting the movement of the piston in one direction. The reduced portion 193 is slidably received in and guided by a bore 195 in a portion 195' of the casing 165 forming a connection between the cylinder 166 and the valve casing 168. The piston rod 192 has a passage 196 extending axially thereof and opening at one end through the end of the rod and at the other end opening to the cylinder 166 through radial ports 197. Also opening to the same end of the cylinder 166 is a passage 198 opening to the bore 181. The bore 195 and the passage 198 are controlled by the valve 182 with the groove 187 in registry with the bore 195 when the valve closes the discharge port 180 so as to provide a discharge passage for the fluid in the cylinder 166 and with the groove 187 out of registry with the bore 195 when the valve is shifted to its open position wherein the discharge port 180 and the passage 198 are in communication. Encircling the larger portion of the rod 192 is a compression spring 199 bearing at one end against the piston 191 and at the other end against the end of the cylinder.

In the portion 195' of the casing is a passage 100 (see Fig. 6) communicating at one end with the bore 195 and opening at the other end to the reservoir 167. This passage is closed by the reduced portion 193 of the rod 192 when the same is in its inner position, but is opened slightly when the piston 191 is shifted outwardly under fluid pressure to provide a by-pass return passage to the reservoir 167.

Also reciprocable in the cylinder 166 is a second piston 202 having a piston rod 203 projecting outwardly through a closure member 204 and connected to the arm 149 of the cam 33. A compression spring 205 encircles the rod 203 and bears at one end against the closure 204 and at the other end against the piston 202, in order to urge the piston inwardly of the cylinder into engagement with the piston 191. The spring 205 is stronger than the spring 199 in order that the piston 191 may normally rest on the shoulder 194.

The pressure generating device and the spring 184 of the valve 182 are so designed that the fluid pressure built up by the fluid pressure generating device is insufficient to overcome the spring 184 and shift the valve 182 to its open position, while the speed of rotation of the driven shaft D² and hence the rate of movement of the vehicle are below a predetermined amount, for example, five M. P. H. However, when the rate of movement exceeds the arbitrary amount, the fluid pressure generated by the elements 172 and 173 is sufficient to overcome the spring 184, thereby shifting the valve to its open position and permitting the supply of pressure fluid to the right end of the cylinder 166 as viewed in Figs. 6 and 8, causing the piston 191 and in turn the piston 202 and its rod 203 to be shifted to the left. Such shift rotates the cam 33 with the results previously described in connection with the other form of speed responsive device. With such shift the end of rod 192 passes beyond passage 100 slightly opening the same to permit the excess fluid now discharged to the cylinder 166 to be returned to the reservoir. When the rate of movement of the vehicle again drops below the predetermined rate, the spring 184 returns the valve to its closed position, thereby cutting off the supply of pressure fluid to the cylinder 166 and opening communication of the cylinder with the reservoir 167 through the radial ports 189 in the valve and the other passages communicating therewith. With the pressure fluid thus relieved, the spring 205 returns the pistons to their normal position and likewise rotates the cam 33 in a clockwise direction, as viewed in Fig. 1.

I claim as my invention:

1. In an automatic transmission, a driving element, a driven element, an automatic clutch having a driving part, a driven part and speed responsive means determining engagement or disengagement of said parts, said speed responsive means acting to engage said parts at a speed above the normal idling speed of the driving element, means forming a driving connection between said driven element and the driven part of said automatic clutch including first and second coupling devices utilizable in producing differing drive ratios of the transmission, each of said devices having an operative and an inoperative condition, said driving connection forming means providing a first speed ratio when both coupling devices are inoperative, a lower speed ratio when said first coupling device is operative and said second coupling device inoperative, and a still lower speed ratio when said second coupling device is operative, means controlled by the speed responsive means of said automatic clutch returning said second coupling device to inoperative condition when said driving element drops to its normal idling speed, and means responsive to the speed of said driven element operating to return said first coupling device to inoperative condition when said driven element coasts to a speed at which the transmission should normally operate in the first speed ratio.

2. In an automatic transmission, a driving element, a driven element, an automatic clutch having a driving part, a driven part and speed responsive means determining engagement or disengagement of said parts, said speed responsive means acting to engage said parts at a speed above the normal idling speed of the driving element, means forming a driving connection between said driven element and the driven part of said automatic clutch including a pair of coupling devices utilizable in producing differing drive ratios of the transmission, each of said devices having an operative and an inoperative condition and jointly adjustable to produce at least three different speed ratios, means controlled by the speed responsive means of said automatic clutch acting on one of said coupling devices when said driving element drops to its normal idling speed while the transmission is in its lowest speed ratio to increase the speed ratio of the transmission, and means responsive to the speed of said driven element acting on the other of said coupling devices when said driven element coasts to a speed at which the transmission should normally operate in a still higher speed ratio still further to increase the speed ratio of the transmission.

3. In an automatic transmission, a driving element, a driven element, an automatic clutch having a driving part, a driven part and speed responsive means determining engagement or disengagement of said parts, means forming a driving connection between said driven element and the driven part of said automatic clutch including a plurality of coupling devices adjustable to produce differing drives by the transmission, means controlled by the speed responsive means of said automatic clutch exercising control over the engagement of one of said plurality of coupling devices, and means responsive to the speed of said driven element exercising control over the engagement of a plurality of coupling devices including the one over which said automatic clutch exercises control.

4. In an automatic transmission, a driving element, a driven element, an automatic clutch having a driving part, a driven part and speed responsive means determining engagement or disengagement of said parts, means operatively interposed between said driven element and the driven part of said automatic clutch including a plurality of coupling devices utilizable in producing differing drives by the transmission, means controlled by the speed responsive means of said automatic clutch exercising control over the condition of one of said plurality of coupling devices, and means responsive to the speed of said driven element exercising control over the condition of a different one of said plurality of coupling devices.

5. In an automatic transmission, a driving element, a driven element, an automatic clutch having a driving part, a driven part and speed responsive means determining engagement or disengagement of said parts, power transmitting means operatively interposed between said driven element and the driven part of said automatic clutch including a selector element having a neutral and a forward position and first and second coupling devices variously operable to produce different speed ratios between the driving and driven elements, manual means for shifting said selector element to neutral or forward position, a first cam actuated by said manual means, a second cam actuated by the speed responsive means of said automatic clutch, means responsive to the speed of rotation of said driven element, and a third cam actuated by said last mentioned speed responsive means, said first cam assuming control of said coupling devices when said selector element is shifted to neutral position and relinquishing control to said other cams when said selector element is shifted to forward position, said third cam assuming sole control over said first coupling device and joint control with said second cam over said second coupling device.

6. In an automatic transmission, a driving element, a driven element, an automatic clutch having a driving part, a driven part and speed responsive means determining engagement or disengagement of said parts, power transmitting means operatively interposed between said driven element and the driven part of said automatic clutch including a selector element having a neutral and a forward position, a first clutch effective upon engagement to place said power transfitting means in a low speed ratio, a second clutch effective upon engagement and while said first clutch is disengaged to place said power transmitting means in an intermediate speed ratio, said power transmitting means being in a higher speed ratio when both clutches are disengaged, manual means for shifting said selector element to neutral or forward position, a first cam actuated by said manual means and exercising control over both of said clutches when said selector element is in neutral position and relinquishing control when in forward position, a second cam actuated by the speed responsive means of said automatic clutch operating to return said first clutch to disengaged position when said automatic clutch drops out while the transmission was operating in the low speed ratio, a third cam exercising control over both of said clutches, and means responsive to the speed of said driven element actuating said third cam to disengage said second clutch when the speed of said driven element drops below a predetermined rate and there is a temporary cessation of drive by the driving element.

7. In an automatic transmission, a driving element, a driven element, means forming a driving connection between said elements including adjustable means for varying the speed ratio between said elements, a first control device responsive to the speed of said driving element and operating when the rotative speed of said driving element drops below a predetermined value while the transmisison is in a low speed ratio followed by a period of no power transmission between said elements to change said adjustable means to a higher speed ratio, and a second control device responsive to the speed of said driven element and operating when the rotative speed of said driven element drops below a predetermined value during a period of no power transmission between said elements to change said adjustable means to a still higher speed ratio.

8. In an automatic transmission, a driving element, a driven element, means forming a driving connection between said elements including adjustable means for varying the speed ratio between said elements, a first control device responsive to the speed of said driving element and operating when the rotative speed of said driving element drops below a predetermined value while the transmisison is in a low speed ratio to condition said adjustable means for change to a higher speed ratio, and a second control device responsive to the speed of said driven element and operating to condition said adjustable means for change to a still higher speed ratio when the speed of said driven element drops below a predetermined value, final change in the speed ratio taking place during a period of no power transmission between said elements.

9. In an automatic transmission, a driving element, a driven element, means forming a driving connection between said elements including a pair of coupling devices operating under different adjustments thereof to vary the speed ratio between said elements, a first control device responsive to the speed of said driving element, and a second control device responsive to the speed of said driven element, said control devices acting during rotation of said driven element to adjust said coupling devices to change the speed ratio between said elements during periods of operation but of no power transmission from said driving to said driven element to a speed ratio appropriate to the rate of the driven element and have the transmission in readiness for retransmission of power from said driving to said driven element at the appropriate speed ratio.

10. In an automatic transmission for an automotive vehicle, a driving element, a driven element, means operatively interposed between said elements including a pair of coupling devices operating under different adjustments thereof to vary the speed ratio between said elements, a first control means responsive to the speed of rotation of said driving element and operating when said driving element drops below a predetermined rotative speed during a period of no power transmission between said elements to act upon one of said coupling devices to increase the speed ratio of said speed ratio varying means, and a second control means responsive to the rate of movement of the vehicle and operating when the rate of movement of the vehicle drops below a predetermined rate during a period of no power transmission between said elements to act upon the other one of said coupling devices to change the speed ratio of said speed ratio varying means to a still higher speed ratio.

11. In an automatic transmission, a driving element, a driven element, means forming a driving connection between said elements including first and second coupling devices each having different conditions for effecting different speed ratios between said driving and driven elements, a yieldable means for each of said coupling devices cocking the same to assume a certain condition, means for each of said coupling devices including a cam follower operable to uncock the coupling device, means responsive to the speed of rotation of said driving element, a first cam actuated by said speed responsive means, a second cam, and means responsive to the speed of rotation of said driven element actuating said second cam, one of said cams exercising control over one only of said coupling devices and the other of said cams exercising control over the other of said coupling devices.

12. In an automatic transmission, a driving element, a driven element, means forming a driving connection between said elements for varying the speed ratio between said elements including first and second coupling devices each having an operative and an inoperative condition, with adjustment of said first coupling device to operative condition while said second coupling device remains inoperative placing said means in one speed ratio, and adjustment of said second coupling device to operative condition placing said means in a lower speed ratio, a yieldable means for each of said coupling devices cocking the same to assume its operative condition, means responsive to the speed of rotation of said driving element exercising control over said second coupling device only, and means responsive to the speed of rotation of said driven element exercising control over both of said coupling devices.

13. In an automatic transmission, a driving element, a driven element, means forming a driving connection between said elements for varying the speed ratio therebetween including first and second coupling devices each having an operative and an inoperative condition, means for each of said coupling devices cocking the same toward operative condition, means for each of said coupling devices including a cam follower operable to uncock the coupling device and to adjust the same to inoperative condition, means responsive to the speed of rotation of said driving element, a first cam actuated by said speed responsive means exercising control over one only of said coupling devices and operating to uncock and shift said coupling device to inoperative position when said driving element falls below a predetermined speed and is not driving the transmission, means responsive to the speed of rotation of said driven element, and a second cam actuated by said last mentioned means exercising control over all of said coupling devices and operating to uncock and shift said devices to inoperative condition when the speed of rotation of said driven element falls below a predetermined rate and there is no transmission of power from said driving to said driven element.

14. In an automatic transmission, a drive member, a driven member, power transmitting means operatively interposed between said members including a selector element having a neutral and a forward position and a coupling device variable to change the speed ratio between said members, manual means for shifting said selector element to neutral or forward position, a first cam actuated by said manual means exercising control over said coupling device, means responsive to the speed of rotation of said driven member, and a second cam actuated by said speed responsive means and exercising control over said coupling device jointly with said first cam.

15. In an automatic transmission, a drive member, a driven member, power transmitting means operatively interposed between said members including a selector element having a neutral and a forward position and first and second coupling devices variably operable to change the speed ratio between said members, adjustment of said first coupling device to its operative condition while said second coupling device remains inoperative producing a certain speed ratio, and adjustment of said second coupling device to its operative condition producing a lower speed ratio between said members, manual means for shifting said selector element to neutral or forward position, a first cam actuated by said manual means assuming control when said selector element is shifted to neutral position and relinquishing control when said selector element is shifted to forward position, means responsive to the speed of rotation of said drive member, a second cam actuated by said speed responsive means exercising control over said second coupling device when control is relinquished by said first cam, means responsive to the speed of rotation of said driven member, and a third cam actuated by said last mentioned speed responsive means assuming control over said first coupling device when control is relinquished by said first cam.

16. In an automatic transmission, a drive member, a driven member, gearing interposed between said members including a selector gear having a neutral and a forward position and a pair of clutches of the overrunning jaw type, each having an engaged and a disengaged condition, yieldable means for each of said clutches urging the same toward engaged condition, control means for each of said clutches including a cam follower, manual means for shifting said selector gear to neutral or forward position, a first cam actuated by said manual means exercising control over both of said clutches and operable when said manual means is shifted to neutral position positively to disengage said clutches and when the manual means is shifted to forward position to relinquish control over said clutches, a second cam exercising control over one only of said clutches, means responsive to the speed of said drive shaft actuating said second cam, a third cam exercising control over one of said clutches jointly with said second cam and independently over the other of said clutches when said manual means is in forward position, and means responsive to the speed of said driven shaft actuating said third cam, said speed responsive means tending to actuate said cams in a direction to effect disengagement of said clutches respectively as the speeds of said drive and driven members falls below a predetermined value and being operable to overcome the yieldable means of each clutch when there is no transmission of power from the drive member to the driven member.

17. In an automatic transmission, a driving element, a driven element, means forming a driving connection between said elements including means adjustable to vary the speed ratio between said elements, a first control device responsive to the speed of said driving element, and a second control device responsive to the speed of said driven element, said second device comprising a fluid pressure generating means and means actuated by the fluid pressure so generated, said devices acting during rotation of said driven element to adjust said speed ratio varying means to change the speed ratio between said elements during periods of no power transmission from said driving to said driven element to a speed ratio appropriate to the rate of the driven element at the time of retransmission of power from said driving to said driven element.

18. In an automatic transmission, a driving element, a driven element, means forming a driving connection between said elements including a plurality of coupling devices utilizable in producing differing drives by the transmission, a speed responsive device exercising control over the condition of one of said plurality of coupling devices, and means responsive to the speed of said driven element exercising control over the condition of a different one of said plurality of coupling devices, said last mentioned means comprising a piston and cylinder device, fluid pressure generating means driven by said driven element, and valve means interposed between said piston and cylinder device and said pressure generating means controlling the flow of fluid therebetween.

19. In an automatic transmission, a driving element, a driven element, means forming a driving connection between said elements including a pair of coupling devices operating under different adjustments thereof to obtain three different speed ratios between said elements, a first control device responsive to the speed of said driving element and governing one of said coupling devices to obtain a low speed ratio, and a second control device responsive to the speed of said driven element and governing the remaining one of said coupling devices to select one of the two remaining speed ratios.

20. In an automatic transmission, a driving element, a driven element, means forming a driving connection between said elements including adjustable means for varying the speed ratio between said elements, a first control device responsive to the speed of said driving element, and a second control device responsive to the speed of said driven element, said speed responsive control devices being operative during deceleration of said drive and driven elements in response to speed only of the respective elements to adjust the adjustable means of the driving connection to a speed ratio most appropriate to the final speed of the driven element.

21. In an automatic transmission, a driving element, a driven element, means forming a driving connection between said elements including adjustable means for varying the speed ratio between said elements, a first control device responsive to the speed of said driving element exercising control over the adjustment of said adjustable means to a low speed ratio, and a second control device responsive to the speed of said driven element exercising control over the adjustment of said adjustable means to higher speed ratios.

22. In an automatic transmission, a drive member, a driven member, power transmitting means operatively interposed between said members including a coupling device engageable or disengageable to change the speed ratio between said members, yieldable means urging said coupling device toward engaged position, positive means including a cam follower for disengaging said coupling device, cam means positively disengaging said coupling device or freeing the same to the influence of said yieldable means, and means responsive to the speed of rotation of said driven member actuating said cam means.

23. In an automatic transmission, a driving element, a driven element, means forming a driving connection between said elements including a pair of adjustable means each resisting adjustment to a higher speed ratio during periods of power transmission between said elements, a first control device responsive to the speed of said driving element, said device being normally ineffective during periods of power transmission to change either of said adjustable means but effective during a period of no power transmission and when the rotative speed of said driving element drops below a predetermined value to change one only of said adjustable means to effect a higher speed ratio between said elements, and a second control device responsive to the speed of said driven element, said second control device being normally ineffective during periods of power transmission to change either of said adjustable means but effective during a period of no power transmission and when the rotative speed of said driven element drops below a predetermined value to change the other of said adjustable means to effect a still higher speed ratio between said elements.

24. In an automatic transmission, a driving element, a driven element, means including a pair of clutches of the overrunning jaw type forming a variable speed ratio driving connection between said elements, a first control device responsive to the speed of said driving element and operating when the rotative speed of said driving element drops below a predetermined value while the transmission is in a low speed ratio to urge adjustment of one of said clutches to obtain a higher speed ratio between said elements, said control device being normally incapable of effecting adjustment of said one clutch during periods of power transmission between said elements but operable to effect adjustment during a period of no power transmission, and a second control device responsive to the speed of said driven element and operating when the rotative speed of said driven element drops below the predetermined value to urge adjustment of said remaining clutch to obtain a still higher speed ratio between said elements, said second control device being normally incapable of effecting adjustment of said remaining clutch during periods of power transmission between said elements but operable to effect adjustment during a period of no power transmission.

25. In an automatic transmission, a driving element, a driven element, means forming a driving connection between said elements including a first clutch of the overrunning jaw type operable when engaged to produce one speed ratio and a second clutch of the overrunning jaw type operable when engaged to produce a lower speed ratio, a first control device responsive to the speed of said driving element and operating when the rotative speed of said driving element drops below a predetermined value while the transmission is in a low speed ratio to urge disengagement of said second clutch, said control device being normally incapable of disengaging said second clutch during periods of power transmission between said elements but operable to effect disengagement during a period of no power transmission, and a second control device responsive to the speed of said driven element and operating when the rotative speed of said driven element drops below a predetermined value to urge disengagement of said second clutch, said second control device being normally incapable of effecting disengagement of said second clutch during periods of power transmission between said elements but operable to effect disengagement during a period of no power transmission.

26. In an automatic transmission, a driving element, a driven element, means forming a driving connection between said elements including a plurality of adjustable means for varying the speed ratio between said elements, each of said adjustable means having an operative and an inoperative position and each resisting change from operative to inoperative position during periods of power transmission between said elements, a first control device associated with one of said adjustable means and having resilient means urging the one of said adjustable means to inoperative position, and centrifugal means responsive to the speed of said driving element and overcoming said resilient means when the rotative speed of said driving element is above a predetermined value, said resilient means being normally incapable of changing the said one adjustable means to inoperative position during periods of power transmission but operable when the rotative speed of said driving element drops below a predetermined value and during a period of no power transmission to effect change from operative to inoperative position, and a second control device associated with the remaining one of said adjustable means and having a resilient means urging the remaining adjustable means toward inoperative position, and centrifugal means responsive to the speed of said driven element, the resilient means of said second control device being normally incapable during periods of power transmission to effect change of the adjustable means controlled thereby from operative to inoperative position but operable when the speed of said driven element drops below a predetermined value and during a period of no power transmission to effect change from operative to inoperative position of said remaining adjustable means.

27. In an automatic transmission, a driving element, a driven element, means forming a driving connection between said elements including a pair of coupling devices operating under different adjustments thereof to vary the speed ratios between said elements, a first control device responsive to the speed of said driving element, and a second control device responsive to the speed of said driven element, means associating said first control device with one only of said coupling devices, said first control device operating when the speed of said driving element drops below a predetermined value to urge the one coupling device to an adjustment increasing the speed ratio of said driving connection, means associating said second control device with the remaining one of said pair of coupling devices, said second control device operating when the driven elements drop below a predetermined speed to urge the remaining one of said coupling devices to an adjustment still further increasing the speed ratio between said elements, both of said control devices being normally incapable of effecting adjustment of said coupling devices during periods of power transmission but operative during periods of no power transmission to complete appropriate adjustments of said coupling devices to have the transmission in readiness for retransmission of power from said driving to said driven element at an appropriate speed ratio.

28. In an automatic transmission, a driving element, a driven element, means forming a driving connection between said elements including a pair of coupling devices operating under different adjustments thereof to obtain a low, an intermediate and a higher speed ratio between said elements, one of said coupling devices when engaged producing the low speed ratio, the other of said coupling devices when the first mentioned coupling device is disengaged selectively governing operation of the transmission at intermediate or higher speed ratio, a first control device responsive to the speed of said driving element and governing the one of said coupling devices producing the low speed ratio, and a second control device responsive to the speed of said driven element governing the remaining one of said coupling devices to select one of the two remaining speed ratios.

29. In an automatic transmission, a drive member, a driven member, power transmitting means operatively interposed between said members including a selector element having a neutral and a forward position and first and second coupling devices variably operable to change the speed ratio between said members, manual means for shifting said selector element to neutral or forward position, means associated with said selector means exercising control over engagement of either of said coupling devices when said selector element is in neutral position, means responsive to the speed of rotation of said drive shaft exercising control over one only of said coupling devices, and means responsive to the speed of rotation of said driven shaft exercising control over the other of said coupling devices.

30. In an automatic transmission, a driving element, a driven element, means forming a driving connection between said elements including a plurality of coupling devices adjustable to produce differing drives by the transmission, means responsive to the speed of rotation of said driving element exercising control over the adjustment of one of said plurality of coupling devices, means responsive to the speed of said driven element exercising control over the adjustment of a plurality of coupling devices including the one over which said first mentioned means exercises control, and manual means overruling both of the automatic speed responsive means.

31. In an automatic transmission, a driving element, a driven element, power transmitting means operatively interposed between said elements including a selector element having a neutral and a forward position and a plurality of coupling devices variously operable to produce different speed ratios between said driving and driven elements, manual means for shifting said selector element to neutral or forward position, means responsive to the speed of rotation of said driving element, means responsive to the speed of rotation of said driven element, and means associated with said selector means assuming control of said coupling devices when said selector element is shifted to neutral position and relinquishing control to said speed responsive means when said selector element is shifted to forward position, said means responsive to the speed of said driven element assuming sole control over one of said coupling devices and joint control with said means responsive to the speed of said driving element over the other of said coupling devices when control is relinquished by the means associated with said selector means.

32. In an automatic transmission, a driving element, a driven element, means forming a driving connection between said elements including a first, a second and a third coupling device, and an overrunning clutch associated with said third coupling device, said first and second coupling devices operating under different adjustments thereof and while said third coupling device is in uncoupled condition to obtain a low, an intermediate, and a higher speed ratio between said elements, said first coupling device when engaged producing the low speed ratio, said second coupling device when said first coupling device is disengaged selectively governing operation of the transmission at intermediate or higher speed ratios, a first control device responsive to the speed of said driving element exercising control over said first coupling device, a second control device responsive to the speed of said driven element exercising control over said second coupling device, and manual means operable when the transmission is in the low speed ratio to adjust said first coupling device and permitting engagement of said third coupling device to obtain a positive intermediate speed ratio.

33. In an automatic transmission, a driving element, a driven element, means forming a driving connection between said elements including a first, a second and a third coupling device, an overrunning clutch associated with said third coupling device, and a selector element having a neutral, a forward and an intermediate speed lockup position, said first and second coupling devices operating under different adjustments thereof and while said third coupling device is in uncoupled condition to obtain a low, an intermediate, and a higher speed ratio between said elements, said first coupling device when engaged producing the low speed ratio, said second coupling device when said first coupling device is disengaged selectively governing operation of the transmission at intermediate or higher speed ratios, a first control device responsive to the speed of said driving element exercising control over said first coupling device, and means associated with said selector element operable when the selector element is in neutral position to take over control of said first coupling device to the exclusion of said speed responsive means, operable when the selector element is in forward position to vest control in said speed responsive means, and operable when the selector element is in intermediate speed lock-up position to permit said third coupling device to be engaged while holding said first coupling device partially engaged to the extent that the driven element may drive the driving element through said first coupling device but that the driving element may not drive the driven element through said first coupling device.

34. In an automatic transmission for an automotive vehicle, a driving element, a driven element, an automatic clutch having a driving part, a driven part and speed responsive means, said clutch having a plurality of positions including an automatic disengaged position and an engaged position which may be assumed when the driving part is not rotating, power transmitting means operatively interposed between said driven part and said driven element including a clutch of the overruning jaw type, means associated with said automatic clutch exercising control over said jaw clutch and operable when said clutch is in automatic idle position to retain said jaw clutch disengaged and operable when the automatic clutch is in engaged position to permit partial engagement of said jaw clutch, and manually operable means for placing said automatic clutch in engaged position.

35. In an automatic transmission for an automotive vehicle, a driving element, a driven element, an automatic clutch having a driving part, a driven part and speed responsive means, said clutch having a plurality of positions including an automatic idle position and a manual engaged position, the latter of which may be assumed when the driving part is not rotating, means responsive to the operation of the engine of the automotive vehicle operating to retain said automatic clutch in automatic idle position, power transmitting means operatively interposed between said driven part of the clutch and said driven element including a plurality of clutches, a positive drive gear train and a neutral, forward or reverse selector element operable when in reverse to complete the positive drive gear train, manually actuable control means determining the position of said selector element including means exercising control over said clutches and operable when said selector element is shifted to reverse position to hold said clutches disengaged, and manual means operable when the engine of the vehicle is not operating to place said automatic clutch in engaged position to complete a positive train between the driving part of said automatic clutch and said driven element to hold the vehicle stationary by the compression of the engine thereof.

OSCAR H. BANKER.